Figure 1:
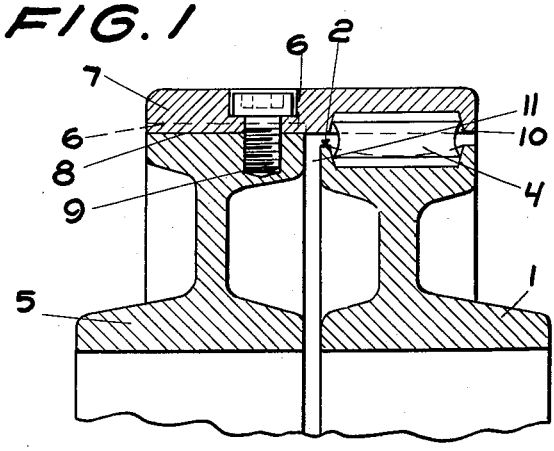

April 15, 1941.   N. G. A. MALMQUIST   2,238,531

RESILIENT SHAFT COUPLING

Filed March 17, 1939

Inventor:
N. G. A. Malmquist
By E. F. Wenderoth
Atty

Patented Apr. 15, 1941

2,238,531

UNITED STATES PATENT OFFICE 2,238,531

RESILIENT SHAFT COUPLING

Nils Gunnar August Malmquist, Malmo, Sweden

Application March 17, 1939, Serial No. 262,581
In France March 19, 1938

4 Claims. (Cl. 64—11)

This invention relates to couplings between adjoining ends of shafts or like members for conveying rotary motion. More particularly the invention relates to shaft couplings of the kind comprising two coupling members which are rigidly secured on the adjoining ends of the shafts or like members and which are interconnected by a resiliently deformable connecting means for absorbing shocks and vibrations and for permitting axial and radial as well as angular displacement of the axes of the shafts in relation to each other.

In shaft couplings of this kind it already has been proposed to construct the resiliently deformable connecting means between the two coupling members of rubber.

Figure 2:
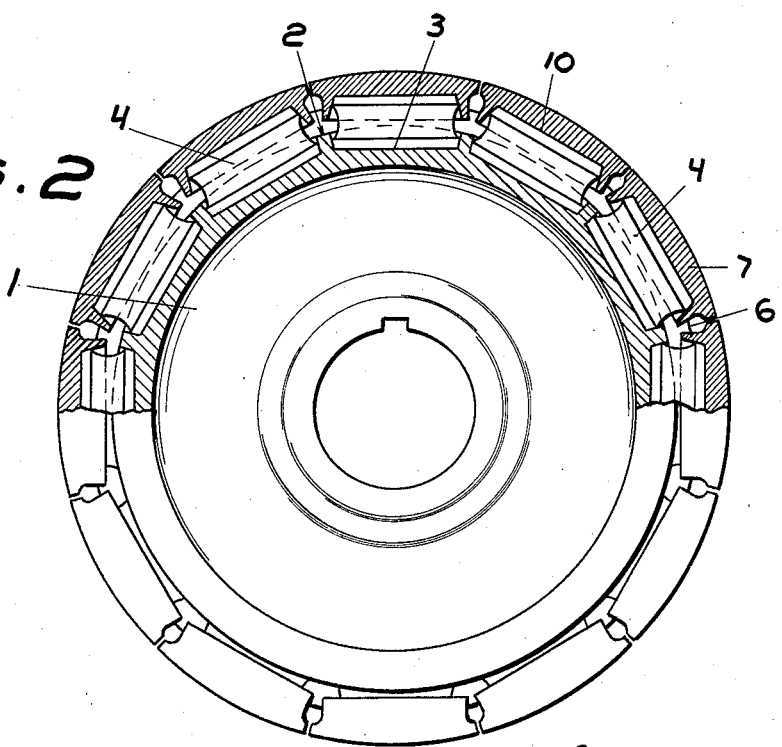

According to the invention, in a shaft coupling comprising two coupling members adapted to rigidly secured on adjoining ends of two shafts or like members for conveying rotary motion, and resiliently interconnected by means of rubber, this rubber is arranged in the form of a plurality of flexible rubber blocks distributed around the axis of the coupling and inserted with their opposite ends into opposing recesses in the two coupling members between which they are held in place in a compressed state. Arranged in this manner the rubber is very effectively utilized for its purpose which is to render the coupling resilient in all directions, and the rubber is preserved to a high degree from tensile strains and from friction against metal so that the rubber will last for long times. Further this arrangement of the rubber permits a simple construction of the coupling and renders it relatively inexpensive to manufacture and keep in repair, the rubber being easily accessible for inspection and renewal. The invention is especially advantageous in these respects in a preferred embodiment in which the flexible rubber blocks are disposed radially in relation to the axis of the coupling. In this case, by providing the recesses for the inner ends of the radially disposed rubber blocks in the outer circumference of a disk or the like forming one of the coupling members, and by providing the recesses for the outer ends of the rubber blocks in individually removable overheads on a second disk or the like forming the other coupling member, the rubber blocks may be taken out and put in place individually for inspection and renewal, without it being necessary to dismount the said disks from the adjoining ends of the shafts or to displace the latter, or the machines to which they belong, out of their positions in relation to each other. Further features and advantages of the invention will be apparent from the following description taken in connection with the accompanying drawing in which:

Fig. 1 is a fragmental axial section and Fig. 2 a side view, partly in section, of a preferred form of the resilient shaft coupling according to the invention, having circumferentially disposed flexible rubber blocks.

In the preferred form of the invention illustrated in Figs. 1 and 2, a disk 1 or the like, forming one of two coupling members to be rigidly secured on the adjoining ends of two shafts or like members to be coupled together for conveying rotary motion, is provided in its cylindrical outer circumference 2 with a number of suitably distributed recesses 3 with plain bottoms and inwardly slightly tapering side walls. A second disk 5 forming the other coupling member likewise has a cylindrical outer circumference 6 the diameter of which is somewhat greater than the diameter of the cylindrical circumference 2 of the disk 1. When secured in place on the adjoining ends of the two shafts to be coupled together the disks 1 and 2 leave between themselves a clearance 11 sufficient to permit a resilient play of the disks in relation to each other. Removably secured on the cylindrical circumference 6 of the disk 5 are overheads 7 projecting over the cylindrical circumference 2 of the disk 1. The overheads 7 are fitted in transverse grooves in the cylindrical circumference 6 of the disk 5 and are secured in place by means of screws 9. The overheads 7 and the recesses 3 are equal in number, and in the inner side of the protecting portion of each overhead 7 there is provided a recess 10 which opposes one of the recesses 3 and is of substantially the same form and size as the latter. Flexible rubber blocks 4 preferably of circular cross section and having short slightly tapering end portions, are inserted with the latter in the opposing recesses 3 and 10. The dimensions of the parts above described and the length of the rubber blocks 4 are so selected that when tightening the screws 9 the rubber blocks are subjected to such a compression that the radial expansion of the rubber blocks resulting therefrom gives to the end portions of the rubber blocks a firm holding in the recesses 3 and 10, which withstands the greatest stresses to which the rubber blocks may be subjected in the use of the coupling. The free length of the rubber blocks between their seated end portions tapers from both ends towards the middle of the block. The taper is such as to give to the free length of the block a contour which in the uncompressed state of the block is so highly concave that it remains concave also in the compressed state of the block when it is in place in the coupling. In this manner the rubber is practically preserved from tensile strains and from frictional motion against the metal parts of the coupling.

According to the magnitude of the torques to be transmitted through the coupling its dimensions, for instance the number and the diameter of the flexible rubber blocks and their distance from the axis of the coupling, etc., may be varied in different ways to suit the circumstances. For instance, two or more rows of flexible rubber blocks may be arranged side by side on the cylindrical circumference 2 for rendering the coupling capable of transmitting greater torques.

In the embodiment illustrated in Figs. 1 and 2 the outer sides of the overheads 7 are rounded so that together they form a sufficiently continuous and smooth surface to make it unnecessary to provide a surrounding casing to safe-guard against accidents.

The rubber blocks above described, due to their flexibility, have a higher degree of resiliency in directions perpendicular to the axes of the blocks than in the directions of these axes. This difference in resiliency in the different directions can be utilized for obtaining a higher degree of resiliency of the coupling in the directions in which the greatest relative movements of the coupling members will take place, than in the other directions, by arranging the rubber blocks with their axes parallel or perpendicular to the axis of the coupling according to the circumstances. Relative movements between the coupling members in the direction of the axis of the coupling will occur substantially when the axes of the coupled shafts are out of alignment, that is angularly displaced in relation to each other. Relative movements between the coupling members in radial directions will occur substantially when the axes of the coupled shafts, even if parallel, are eccentrically displaced in relation to each other. In cases where the occurring relative movements of the coupling members are decidedly in the axial directions a radial arrangement of the flexible rubber blocks in the coupling according to the above described embodiment illustrated in Figs. 1 and 2 is preferred, and in practice these cases are in a decided majority.

What I claim is:

1. A resilient shaft coupling comprising two disk-shaped coupling members adapted to be rigidly secured on adjoining ends of two shafts or like members for conveying rotary motion, individually removable overheads secured on one of said coupling members and axially overlapping the other coupling member, said other coupling member and said axially overlapping overheads being provided in their facing sides with radially opposing shallow recesses, and substantially cylindrical rubber blocks seated with their opposite ends in said radially opposing recesses and held in a compressed state between said overheads and said other coupling member.

2. A shaft coupling as claimed in claim 1 and further characterized in that the rubber blocks and the individually removable overheads provided with the recesses for the outer ends of the blocks are equal in number, one of the recesses for the outer ends of the blocks being provided in each of the overheads.

3. A shaft coupling as claimed in claim 1 and further characterized in that the individually removable overheads are secured on the outer circumference of the first mentioned coupling member, the latter being of greater diameter than the other coupling member provided with the recesses for the inner ends of the radially disposed rubber blocks.

4. A shaft coupling as claimed in claim 1 and further characterized in that the overheads are seated in transverse grooves in the circumference of the first-mentioned coupling member and are secured in place by means of screws or the like.

NILS GUNNAR AUGUST MALMQUIST.